United States Patent [19]

O'Neill

[11] Patent Number: 5,358,149
[45] Date of Patent: Oct. 25, 1994

[54] PRESSURE BUILD-UP PUMP SPRAYER HAVING ANTI-CLOGGING MEANS

[76] Inventor: Richard K. O'Neill, P.O. Box 2452, Wrightwood, Calif. 92397

[21] Appl. No.: 135,854

[22] Filed: Oct. 13, 1993

Related U.S. Application Data

[63] Continuation of Ser. No. 992,083, Dec. 17, 1992, abandoned.

[51] Int. Cl.⁵ .............................................. G01F 11/00
[52] U.S. Cl. ...................................... 222/321; 239/333
[58] Field of Search ............... 222/321, 380, 383, 385; 239/333

[56] References Cited

U.S. PATENT DOCUMENTS

| | | | |
|---|---|---|---|
| 4,154,374 | 5/1979 | Kirk, Jr. | 222/385 X |
| 4,410,107 | 10/1983 | Corsette | 222/321 |
| 4,516,727 | 5/1985 | Saito et al. | 222/321 X |
| 4,923,094 | 5/1990 | O'Neill | 222/383 X |
| 5,088,629 | 2/1992 | O'Neill | 222/321 |

Primary Examiner—Andres Kashnikow
Assistant Examiner—Anthoula Pomrening
Attorney, Agent, or Firm—Hawes & Fischer

[57] ABSTRACT

A pressure build-up pump sprayer to be interconnected with a liquid filled container and having a poppet assembly including inner and outer coaxially aligned pressure chambers. The inner pressure chamber communicates with the orifice outlet of the sprayer, and the outer pressure chamber is initially filled with air. Prior to priming the sprayer, an air-tight seal isolates the inner and outer pressure chambers from one another. During the priming cycle, the air-tight seal is broken and air trapped within the outer pressure chamber is exhausted through the orifice outlet by way of the inner pressure chamber. The outer pressure chamber is then filled with liquid that is sprayed therefrom through the orifice outlet during a downstroke of the liquid dispensing cycle. During a subsequent upstroke of the liquid dispensing cycle, the outer pressure chamber is refilled with liquid, and excess liquid at the orifice outlet is pulled into the inner pressure chamber under suction to avoid clogging the orifice outlet as a consequence of a build-up of dry liquid residue.

14 Claims, 5 Drawing Sheets

PRESSURE BUILD-UP PUMP SPRAYER HAVING ANTI-CLOGGING MEANS

This application is a continuation, of application No. 07/992,083, filed Dec. 17, 1992, now abandoned.

BACKGROUND OF THE INVENTION

1. Field of the Invention

This invention relates to a pressure build-up pump sprayer to be interconnected with a liquid-filled container and having a unique poppet and pressure chamber configuration which facilitates the sprayer being quickly and efficiently primed after a few stroke cycles and which prevents a build-up of liquid residue at the orifice outlet of the sprayer to avoid clogging.

2. Background Art

In my U.S. Pat. No. 5,088,629 issued Feb. 18, 1992, I disclosed a manually operated, pressure build-up pump sprayer of the type to be connected to a liquid filled container and adapted to be easily and efficiently primed. My earlier pump sprayer was characterized by a relatively few number of component parts and a correspondingly reduced manufacturing cost relative to conventional sprayers. What is more, my earlier sprayer included a series of air-tight seals and valves to prevent the leakage of liquid and allow spraying of the liquid in the event that the container was tipped or turned over.

A problem that is common to many conventional pump sprayers is clogging. During each stroke cycle after liquid is atomized and sprayed from an orifice outlet of the spray head, a small pool of excess liquid commonly forms in and around the outlet. This liquid pool will frequently dry into a residue that has been known to clog the orifice outlet. Consequently, the pump sprayer may be rendered ineffective or hard to use without first cleaning to remove the residue. Such action may prove to be time consuming and inconvenient and result in the pump sprayer being scrapped prematurely.

Therefore, it would be desirable to combine the advantages of the pump sprayer disclosed in my U.S. Pat. No. 5,088,629 with additional improvements that are adapted to prevent clogging of the orifice outlet and the inconvenience and waste associated therewith.

SUMMARY OF THE INVENTION

In general terms, a manually operated pressure build-up pump sprayer is disclosed to be interconnected with a container for atomizing various liquids, including, but not limited to, hair products, deodorants, perfumes, cosmetic preparations, and the like. The pump sprayer of this invention comprises a cap to be detachably connected to a liquid container and having a suction tube extending therefrom into the container, a hollow stationary valve housing that is molded into the cap and extended longitudinally therethrough, a hollow valve body that is slidably received within the valve housing, and a piston or poppet having inner and outer cylindrical walls that are arranged in spaced coaxial alignment to form inner and outer pressure chambers. The inner pressure chamber of the poppet communicates fluidically with the orifice outlet at a spray head of the sprayer by way of a hollow sealing head at the top of the poppet. The outer pressure chamber of the poppet is normally isolated from the orifice outlet by engagement of the sealing head with a valve seat below the orifice outlet. The poppet is biased by a compression spring and adapted for reciprocal movement through the valve body, whereby air within the outer poppet pressure chamber is compressed and evacuated to the atmosphere during a downstroke of the priming cycle. During an upstroke of the priming cycle, the outer poppet pressure chamber is filled with liquid from the container.

In accordance with a preferred embodiment of the present invention, one or more protrusions extend from the inner wall of the poppet into the inner poppet pressure chamber. At the bottom of a downstroke of the priming cycle of the pump sprayer, the poppet has been moved downwardly through the valve body until the protrusions of the poppet inner wall are moved into engagement with a flared sealing skirt of a valve stem that is located within the poppet inner pressure chamber. As a result of the foregoing, the flared sealing skirt is slightly deformed to establish openings or air gaps between the sealing skirt and the inner poppet wall which forms the inner pressure chamber. Therefore, compressed air within the poppet outer chamber is evacuated to the atmosphere at the orifice outlet by way of the air gaps in the inner pressure chamber and the hollow sealing head of the poppet.

In accordance with another preferred embodiment of this invention and during an upstroke of the fluid dispensing cycle of the pump sprayer after fluid has been atomized and sprayed from the orifice outlet of the spray head, a vacuum is created in the inner and outer pressure chambers of the poppet. The vacuum created within the inner pressure chamber of the poppet during the conclusion of the upstroke draws liquid away from the orifice outlet into the inner pressure chamber through the hollow sealing head of the poppet. By virtue of the foregoing, excess liquid in the outlet will be suctioned therefrom to reduce the possibility that the outlet will become clogged with dry liquid residue and the pump sprayer rendered ineffective.

DETAILED DESCRIPTION OF THE INVENTION

Figure 1:
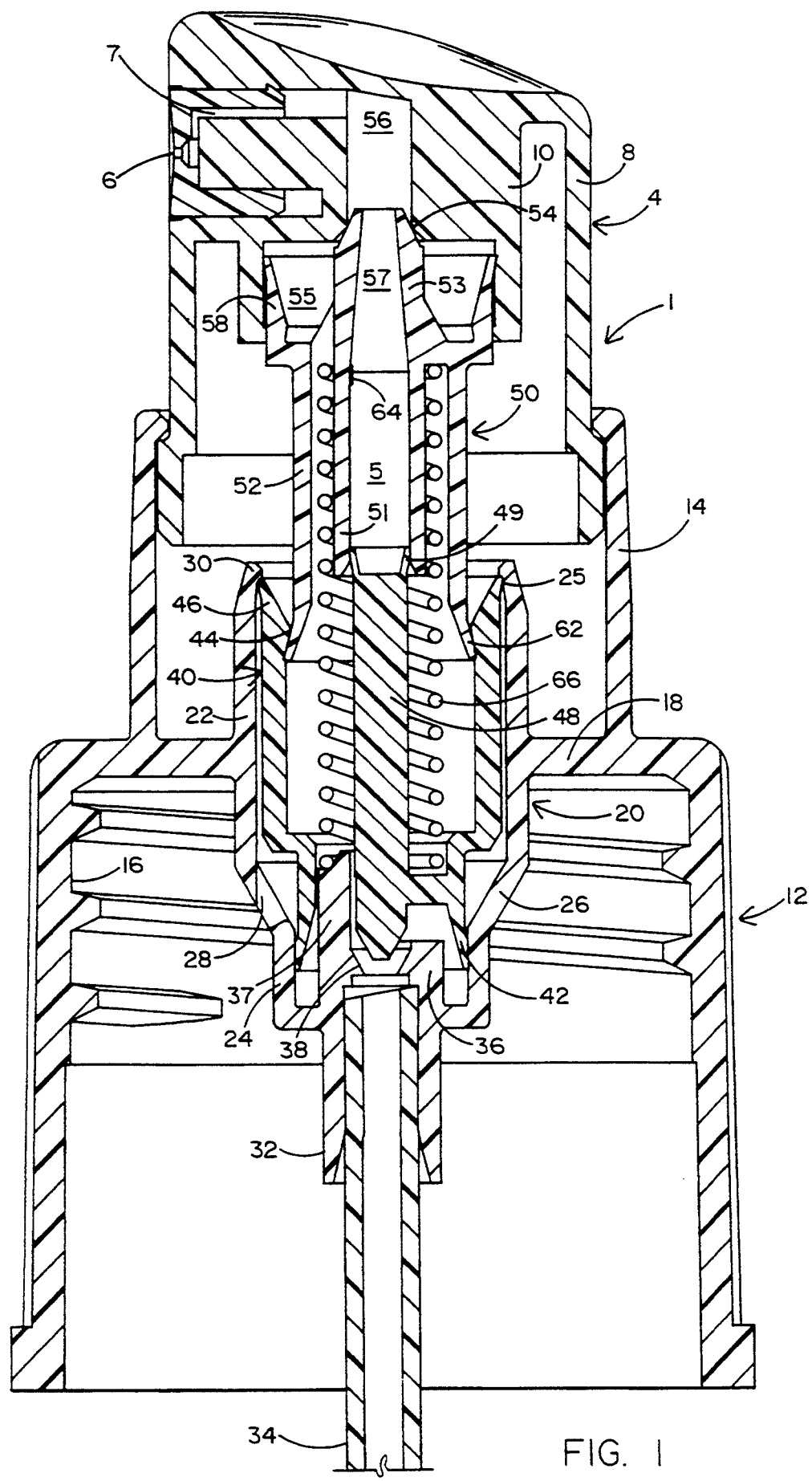
FIG. 1 is a cross-section of the pressure build-up pump sprayer of the present invention in the at rest condition.

The pressure build-up pump sprayer which forms the present invention is described while referring concurrently to FIGS. 1-4 of the drawings, where the sprayer 1 is shown with a detachable hood (not shown) removed so as to expose a spray head 4 to which a downward force is to be manually applied. The spray head 4 has an orifice outlet 6 through which a liquid can be dispensed when the pump sprayer 1 is primed and the head 4 is depressed during a downstroke. A fluid passage 7 is formed through spray head 4 to communicate with and deliver liquid to outlet 6 from a pressure chamber of a soon to be described piston/poppet 50. The head 4 also has concentrically aligned, inner and outer cylindrical flanges 8 and 10 that move axially and reciprocally relative to a cap portion 12 during the down and up strokes of the sprayer.

The cap 12 is provided with a series of internal screw threads 16 by which the sprayer may be rotated into mating engagement with a series of complementary screw threads from a container (not shown). The container is of conventional configuration and is of the type that may be filled with a variety of different liquids including, but not limited to hair products, deodorants, perfumes, cosmetic preparations, and the like. The cap 12 includes an upwardly extending top wall 14 which slidably receives and guides the lower end of the outer flange 8 of spray head 4 as the head reciprocates relative to the cap. Cap 12 also includes a radially extending end wall 18 and a hollow, stationary valve housing 20 which extends longitudinally through the cap.

Valve housing 20 has an upper cylindrical bore 22 of relatively wide diameter and a lower cylindrical bore 24 of relatively narrow diameter. Coextensively formed between the upper and lower bores 22 and 24 of the valve housing 20 is a conical interface 26 having a vent hole 28 extending therethrough. The top of valve housing 20 (i.e. above the upper bore 22) terminates at an inwardly turned lip 30. Between the upper bore 22 and lip 30 of valve housing 20 lies a short, cylindrical upper sealing surface 25, the diameter of which is less than the diameter of upper bore 22. The bottom of valve housing 20 terminates at a downwardly projecting sleeve 32 in which one end of a suction tube 34 is received and retained. Also located at the bottom of valve housing 20 is a cylindrical, upwardly projecting valve guide 36. At least two integral support fingers 37 (only one of which being visible in the drawings) extend upwardly from valve guide 36 through slots (not shown) formed in a soon to be described valve body 40 in order to support a compression spring 66 and position said spring so as not to interfere with the upward travel of the valve body 40, the details of which will now be described.

Received within the hollow valve housing 20 so as to be concentrically aligned and slidable longitudinally therethrough is a hollow valve body 40. Valve body 40 includes a lower skirt 42 that is disposed in sealing engagement against the lower bore 24 of valve housing 20. The valve body 40 has a radially inward projecting ring 44 which forms an area of reduced diameter at the interior of body 40 and permits said valve body to be reliably engaged by a soon to be described poppet 50. A flared sealing head 46 projects radially outward from valve body 40 towards the upper bore 22 of valve housing 20. As will be described in greater detail, the flared sealing head 46 of valve body 40 is adapted to be positioned in and out of contact with the sealing surface 25 at the top of valve housing 20 to either form an air-tight seal or open an air vent to the container, depending upon whether a force is being applied to spray head 4.

Valve body 40 has a coaxially aligned valve stem 48 extending axially therethrough. The valve stem 48 of valve body 40 is received within and moved longitudinally relative to the valve guide 36 of valve housing 20. As an important detail of this invention, the top of valve stem 48 has a coextensive, flared sealing skirt 49 projecting radially outward therefrom. The bottom of valve stem 48 is tapered and adapted to interact with a lower valve seat 38 of valve housing 20 that is formed at the interface of sleeve 32 and suction tube 34. As will also be disclosed in greater detail, valve stem 48 is adapted to move onto and off the lower valve seat 38 to either seal suction tube 34 against the passage of air and liquid or open said tube to permit the pump sprayer 1 to be in fluid communication with the container to which the sprayer is attached.

Received within the hollow valve body 40 so as to be concentrically aligned with both valve body 40 and valve housing 20 and slidable through valve body 40 is a tubular piston assembly or poppet 50. Poppet 50 includes inner and outer cylindrical walls 51 and 52 with an inner pressure chamber 5 at the interior of the inner cylindrical wall 51 and an outer pressure chamber 55 formed between inner and outer cylindrical walls 51 and 52. Poppet walls 51 and 52 are maintained in spaced coaxial alignment relative to one another so as to travel longitudinally through valve body 40 as a unit. Projecting upwardly from the top of inner poppet wall 51 is a hollow poppet sealing head 53 which (in the at rest condition of FIG. 1) is normally biased so as to lie flush against an upper valve seat 54 and thereby block communication between the outer poppet pressure chamber 55 located between the inner and outer walls 51 and 52 and a valve opening 56 that communicates with the fluid passage 7 and orifice outlet 6 of spray head 4.

The inner pressure chamber 5 of poppet 50 is located at the interior of inner poppet wall 51 and communicates with fluid passage 7 and orifice outlet 6 via the interior 57 of hollow poppet sealing head 53. The receipt of sealing head 53 against upper valve seat 54 and within valve opening 56 prevents liquid within the outer pressure chamber 55 of poppet 50 from leaking past the poppet sealing head 53 and through opening 56. However, during the downstroke of spray head 4 after the sprayer 1 has been primed, the poppet 50 is moved downwardly through valve body 40 and away from spray head 4 to open a spray passage (shown dotted in FIG. 3) through valve opening 56 so that fluid can be discharged from the outer pressure chamber 55 of poppet 50 to spray orifice 6 via fluid passage 7.

Coextensively connected to the upper end of the cylindrical outer wall 52 of poppet 50 is an outwardly flared, cylindrical flange 58 which surrounds the poppet sealing head 53. Once the pump sprayer 1 has been primed, the upper flange 58 of poppet 50 will ride along and maintain a fluid seal against the inner flange 10 of spray head 4 to prevent the premature loss of fluid from the container as poppet 50 moves through valve body 40 to open and close valve opening 56 to the outer pressure chamber 55 of poppet 50. An outwardly flared skirt 62 is coextensively connected to the lower end of the outer wall 52 of poppet 50. Lower skirt 62 is slidably received within the valve body 40 so as to form a seal thereagainst to prevent the escape of liquid past the interface of poppet 50 with valve body 40 as the poppet slides reciprocally through said valve body to prime the pump sprayer 1.

As another important detail of the present invention, one or more protrusions 64 (best shown in FIGS. 5 and 6) projects radially from the inner poppet wall 51 into the inner pressure chamber 5 of poppet 50 at a location below poppet sealing head 53. Although a pair of protrusions 64 are illustrated and described, it is to be expressly understood that any number of protrusions or a continuously raised ridge may extend around the periphery of inner poppet wall 51. As will soon be described, the protrusions 64 of poppet 50 are positioned at approximately the midpoint of inner wall 51 so as to be engaged by the sealing skirt 49 of valve stem 48 when a downward force is applied to spray head 4 to move poppet 50 to its lowermost position through valve body 40 (best shown in FIG. 2) for an advantage that will soon be described.

A coiled compression spring 66 extends longitudinally through the interior of sprayer 1 between the cylindrical inner and outer walls 51 and 52 of poppet 50 from the sealing head 53 of poppet 50 to the support fingers 37 of the valve guide 36 of valve housing 20. The spring 66 surrounds the valve stem 48 of valve body 40 and is retained by stem 48 in coaxial alignment with valve housing 20, valve body 40 and the cylindrical walls 51 and 52 of poppet 50. Spring 66 is fully compressed (best shown in FIG. 2) at the conclusion of the downstroke as the poppet 50 slides downwardly to its lowest position in the valve body 40. The memory of spring 66 is responsible for automatically returning poppet 50 to its at rest position (of FIG. 1) at the beginning of the upstroke when said spring begins to expand.

The operation of the pressure-build up pump sprayer 1 of the present invention is now described while referring particularly to FIG. 1, where the pump sprayer is shown in the at rest condition with the protective hood removed from and exposing the upper wall 14 of cap 12. In the at rest condition (with no downward force being applied to spray head 4), the coil spring 66 biases the poppet 50 to its upper-most position relative to valve body 40 and spray head 4. Thus, the poppet sealing head 53 at the upper end of inner poppet wall 51 is received against upper valve seat 54 and the sealing skirt 49 at the top of valve stem 48 is received against the inner poppet wall 51 within inner pressure chamber 5 to isolate valve opening 56 from the container. Moreover, the upper cylindrical flange 58 of the outer wall 52 of poppet 50 is sealed against the inner flange 10 of spray head 4, the flared skirt 62 at the lower end of said poppet outer wall 52 is received in sealing engagement against valve body 40, and the lower skirt 42 of valve body 40 is sealed against the lower bore 24 of valve housing 20.

By virtue of the inward projecting ring 44 of valve body 40 being engaged by the lower skirt 62 of poppet outer wall 52, the valve body 40 is retained at its uppermost position relative to the stationary valve housing 20 of cap 12, such that the outwardly flared sealing head 46 at the upper end of valve body 40 is received below the inwardly turned lip 30 of valve housing 20 and in sealing engagement against the upper sealing surface 25 thereof, and the outwardly flared skirt 42 at the lower end of valve body 40 is sealed against the lower bore 24 of said valve housing 20. Accordingly, fluid paths between the container and the atmosphere are reliably sealed in the at rest condition of FIG. 1.

Figure 2:
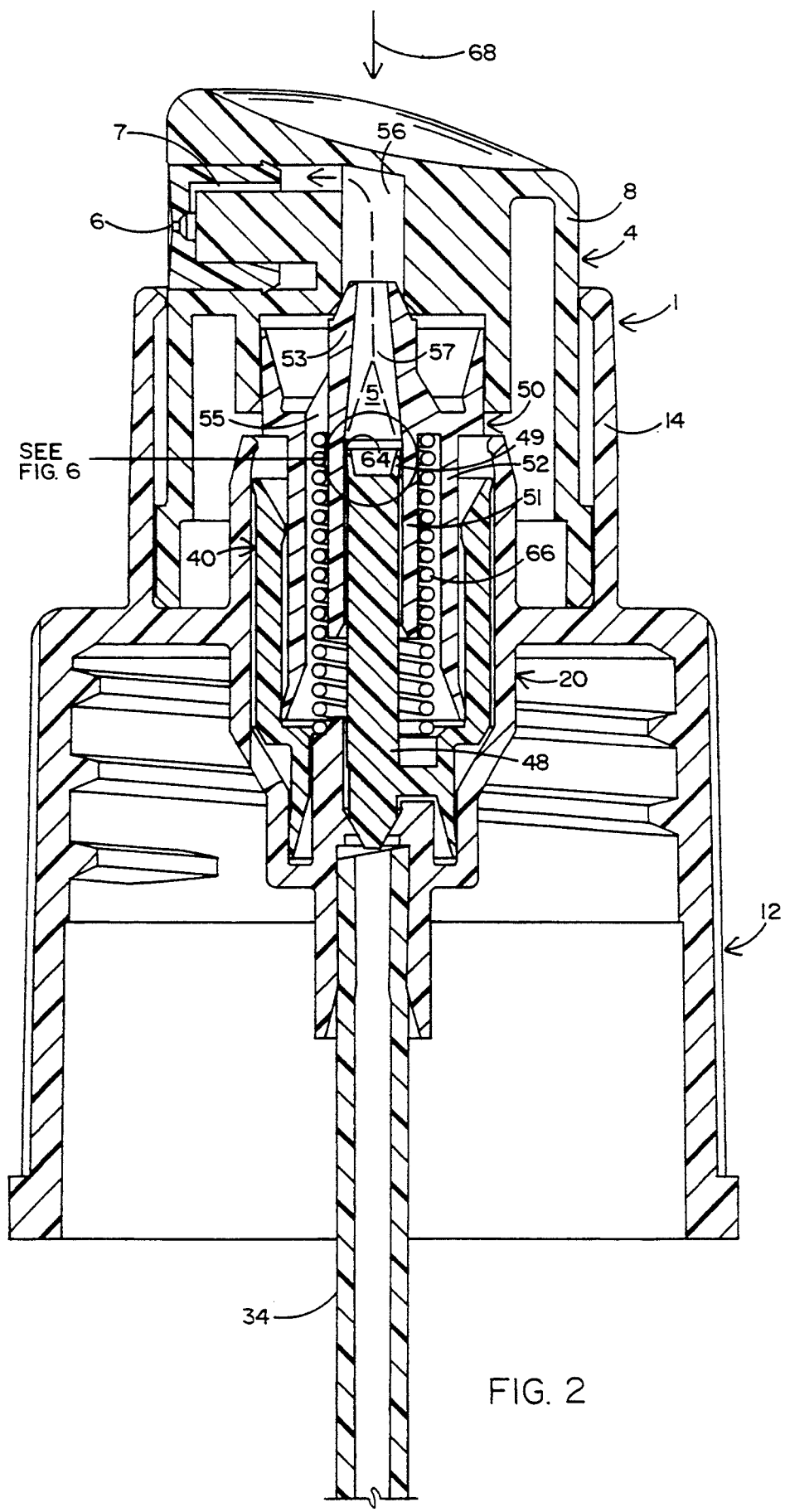
FIG. 2 is a cross-section of the pump sprayer of FIG. 1 at the end of a downstroke while priming the sprayer.

Referring now to FIG. 2, the pump sprayer 1 is shown at the end of a downstroke in response to a downward force (represented by reference arrow 68) that is manually applied to the spray head 4 during priming of the sprayer 1. More particularly, the application of a downward force to spray head 4 causes the spray head to slide downwardly along the upper wall 14 of cap 12 to thereby compress spring 66. The downward movement of spray head 4 correspondingly causes the poppet 50 to move downwardly through the valve body 40, such that all of the air in outer pressure chamber 55 will be compressed. In addition, the valve stem 48 of valve body 40 rides upwardly through the inner pressure chamber 5 at the interior of inner poppet wall 51. Accordingly, the sealing skirt 49 at the top of valve stem 48 is moved into engagement with the protrusions 64 which project radially into inner pressure chamber 5 from inner poppet wall 51.

Figure 5:
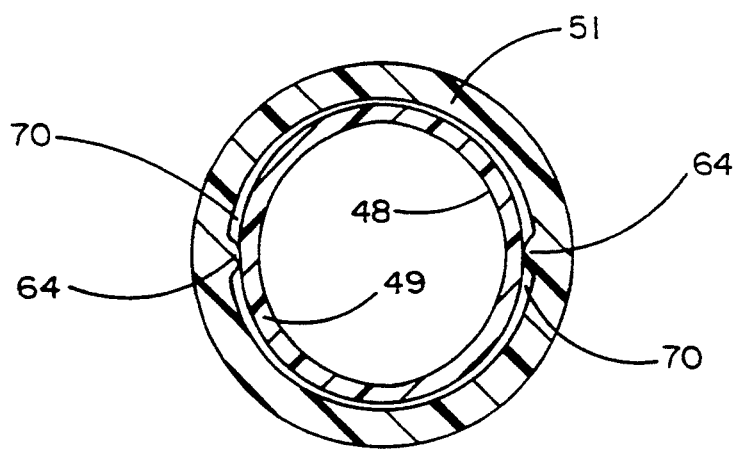
FIG. 5 is a cross-section taken along lines 5—5 of FIG. 6.
Figure 6:
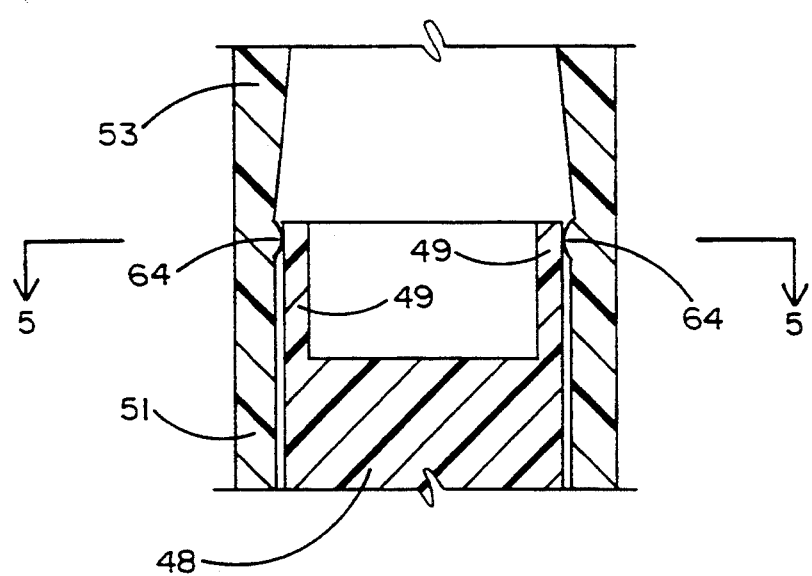
FIG. 6 is an enlarged detail taken from FIG. 2.

In accordance with the present invention, and referring concurrently to FIGS. 5 and 6 of the drawings, a detailed enlargement is shown of the interface of sealing skirt 49 of valve stem 48 with the protrusion 64 of inner poppet wall 51 during priming of the pump sprayer 1 and at the full downstroke of pump sprayer 1 as illustrated in FIG. 2. More particularly, the receipt of skirt 49 against protrusions 64 causes the skirt 49 to flex radially inward (best shown in FIG. 6). As a result, the sealing skirt 49 is slightly deformed to create air gaps 70 between skirt 49 and inner poppet wall 51 (best shown in FIG. 5). Therefore, and referring once again to FIG. 2, an exhaust path (shown dotted) is opened to the atmosphere for the compressed air in the outer pressure chamber 55 of poppet 50 via the inner pressure chamber 5, the hollow poppet sealing head 53, valve opening 56, fluid passage 7 and orifice outlet 6.

Figure 3:
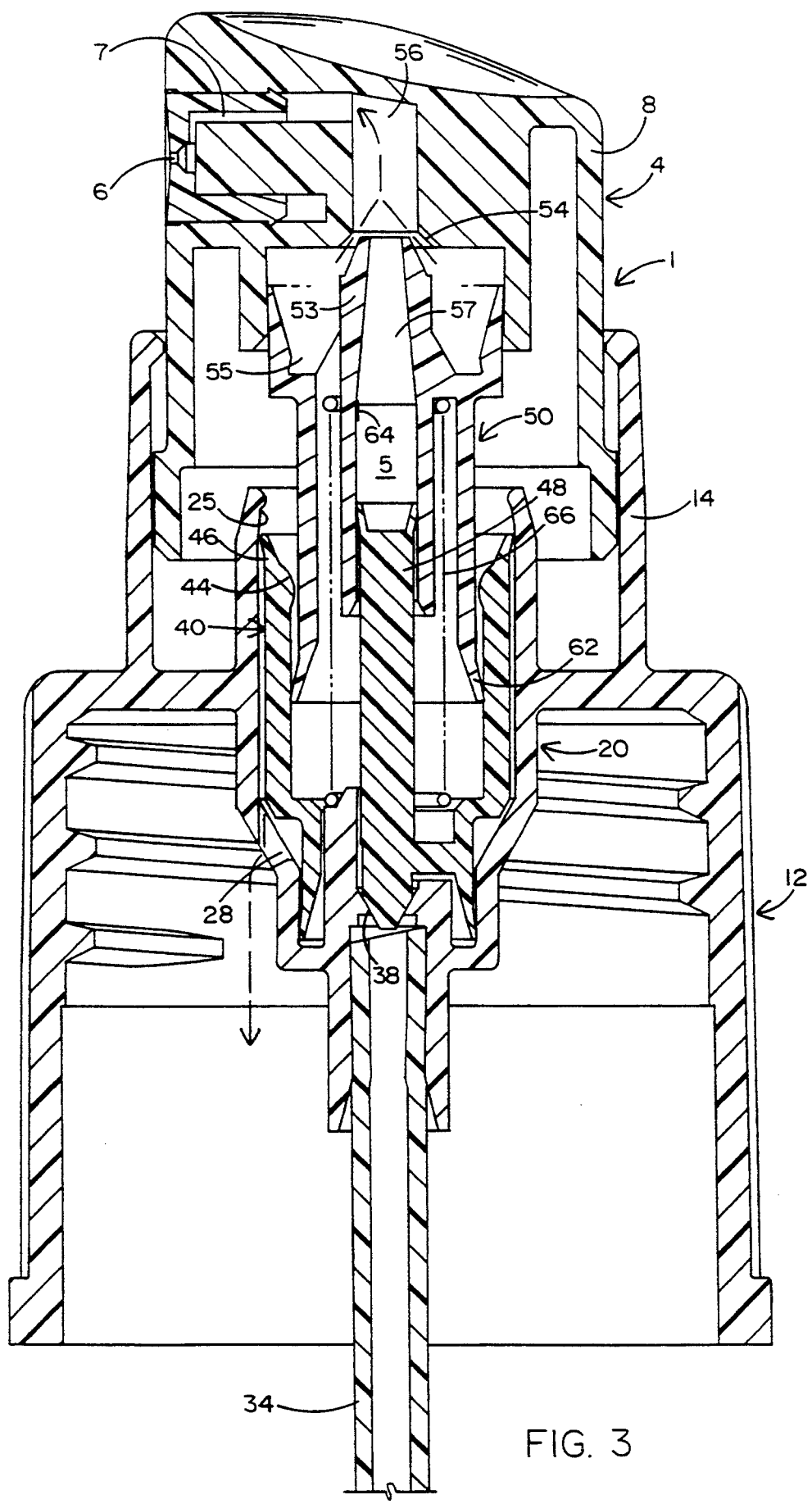
FIG. 3 is a cross-section of the pump sprayer during a downstroke after the sprayer has been primed.

FIG. 3 of the drawings shows the pump sprayer 1 in the middle of a downstroke after the sprayer has first been primed so that liquid can be discharged through orifice outlet 6. The application of a downward force to spray head 4, after liquid has been drawn during the priming cycle from the fluid container into outer poppet pressure chamber 55 via suction tube 34, once again causes the spray head 4 to slide downwardly along the upper wall 14 of cap 12 to compress spring 66 and reduce the volume of outer pressure chamber 55. The pressure created as a result of the downward movement of spray head 4 correspondingly causes the poppet 50 to move downwardly through valve body 40, whereby the sealing head 53 of poppet 50 is urged off the upper valve seat 54. Accordingly, a spray path (shown dotted) is opened from the outer poppet pressure chamber 55 to the orifice outlet 6 via valve opening 56 and fluid passage 7, whereby liquid that is compressed within the outer pressure chamber 55 of poppet 50 will be forced past valve opening 56 and expelled through orifice outlet 6 to the atmosphere.

At the same time during the downstroke of the fluid dispensing cycle that poppet 50 moves through valve body 40, the lower skirt 62 of poppet 50 moves off the inwardly projecting ring 44 and downwardly through valve body 40. Accordingly, the valve body 40 is engaged by and moved with lower skirt 62 downwardly through the valve housing 20, whereby the sealing head 46 of valve body 40 is moved off the upper sealing surface 25 of valve housing 20. Thus, the earlier described seal (of FIG. 1) formed between sealing head 46 of valve body 40 and the upper sealing surface 25 of valve housing 20 during the at rest condition of sprayer 1 is opened and a vent path (shown dotted) is created therebetween through which air from the atmosphere is vented to the interior of the container via the vent hole 28 in valve housing 20. The air vent seal between valve body 40 and valve housing 20 remains open for the duration of the downstroke.

The friction at the interface between the lower skirt 62 of poppet 50 and the valve body 40 causes said valve body to shift towards its lowermost position within valve housing 20 as poppet 50 moves downwardly in response to the force applied to spray head 4. Thus, the valve stem 48 of valve body 40 is urged downwardly from its at rest position of FIG. 1 and into contact with the lower valve seat 38 to seal off the suction tube 34.

Figure 4:
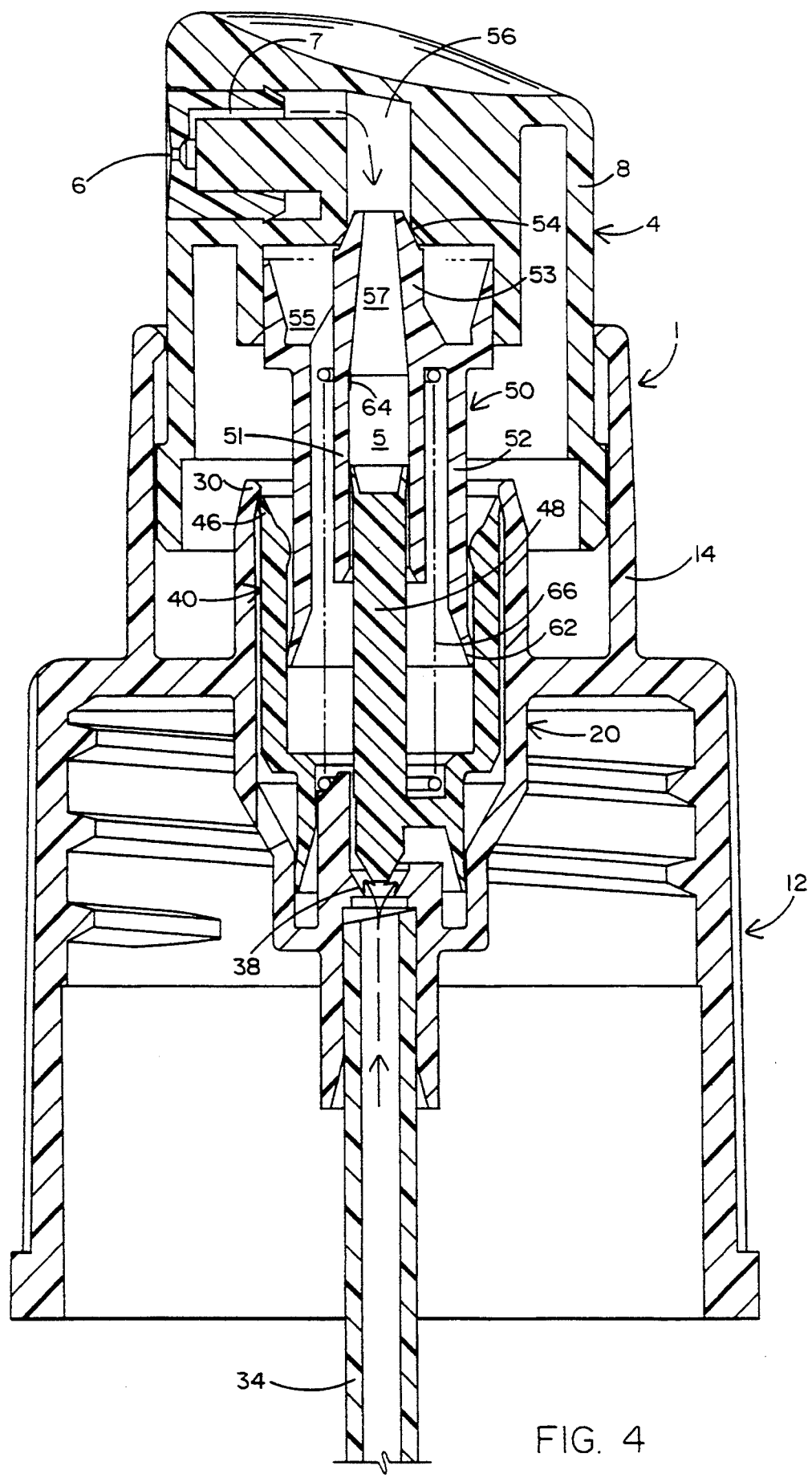
FIG. 4 is a cross-section of the pump sprayer during an upstroke after the sprayer has been primed and fluid sprayed therefrom.

FIG. 4 of the drawings shows the pump sprayer 1 in the middle of an upstroke of the fluid dispensing cycle when the manual force previously applied to spray head 4 is removed and the potential energy stored by spring 66 in its compressed state is released to drive valve body 40, poppet 50 and spray head 4 back towards their at rest positions of FIG. 1. At the conclusion of the downstroke and the very beginning of the upstroke, the poppet 50 is located within valve body 40 such that the lower skirt 62 at the outer wall 52 of poppet 50 which flares outwardly is located in opposing frictional engagement with the lower end of valve body 40. Moreover, the poppet 50 is positioned against the spray head 4 such that the seal between the sealing head 53 and upper valve seat 54 will be reestablished to block the passage between the outer pressure chamber 55 of poppet 50 and valve opening 56.

As the poppet 50 is driven upwardly by spring 66, the valve body 40 is carried a short distance by said poppet towards the inwardly turned lip 30 of valve housing 20. That is, the subsequent engagement of the sealing head 46 of valve body 40 by the lip 30 of valve housing 20 will restrict the upward distance over which the valve body 40 is pulled by poppet 50 during the upstroke. However, as valve body 40 is moved upwardly through valve housing 20 during the first half of the upstroke, the valve stem 48 of valve body 40 is correspondingly moved upwardly and off the lower valve seat 38.

As the poppet 50 continues its upward travel during the second half of the upstroke of the fluid dispensing cycle, the outer pressure chamber 55 of poppet 50 will begin to expand so as to create a vacuum and draw fluid into outer pressure chamber 55 (shown dotted) by means of suction from the container via suction tube 34. Once the outer pressure chamber 55 is filled with fluid, hydraulic pressure will cause the valve body 40 to automatically slide up and down within valve housing 20 during subsequent stroke cycles of the spray head 4, whereby fluid from the container may be successively supplied from the outer pressure chamber 55 of poppet 50 to orifice outlet 6 (via the spray path shown dotted in FIG. 3) during a downstroke of the fluid dispensing cycle and from the container to the outer pressure chamber 55 (via suction tube 34) during the following upstroke.

Moreover, and as another advantage of the present invention, a vacuum is also created in the inner pressure chamber 5 of poppet 50 during the conclusion of the upstroke so as to draw liquid away from the orifice outlet 6. More particularly, and continuing to refer to FIG. 4, a suction path (shown dotted) is established from outlet 6 to the interior 57 of the hollow sealing head 53 of poppet 50 via fluid passage 7 and valve opening 56. By virtue of the foregoing, excess liquid will be pulled inwardly through orifice outlet 6 to reduce the possibility that the liquid will dry to a hard residue and clog the outlet, whereby to render the pump sprayer ineffective. The best results are achieved when a volume of air is suctioned inwardly through orifice outlet 6 such that the liquid level within the inner pressure chamber 5 and sealing head 53 of poppet 50 falls just below said outlet.

By virtue of the present invention, the manually operated pressure build-up pump sprayer 1 may be easily and efficiently primed within a few stroke cycles. That is to say, air trapped within the outer pressure chamber 55 of poppet 50 may be quickly evacuated therefrom to permit the receipt of liquid from the container. Moreover, once the pump sprayer 1 has been primed and liquid sprayed therefrom, excess liquid may be pulled inwardly through the orifice outlet 6 to avoid clogging, as is commonly experienced by conventional pump sprayers.

It will be apparent that while a preferred embodiment of the invention has been shown and described, various modifications and changes may be made without departing from the true spirit and scope of the invention. Having thus set forth the preferred invention, what is claimed is:

1. A manually operated, pressure build-up pump sprayer for dispensing liquid from a container and comprising:

a cap to be removably connected to the container, said cap having a bore extending longitudinally therethrough;

a spray head having an orifice outlet through which liquid from the container is sprayed to the atmosphere, said spray head being interconnected with and moved reciprocally relative to said cap in response to a force manually applied to said spray head;

poppet means engaging said spray head and moving reciprocally through the bore of said cap, said poppet means including cylindrical inner and outer walls concentrically aligned with and spaced from one another such that an inner pressure chamber is formed at the interior of said inner cylindrical wall and an outer pressure chamber is formed in the space between said inner and outer cylindrical walls, said inner pressure chamber communicating fluidically with said orifice outlet of said spray head and said outer pressure chamber having air trapped therein prior to priming said sprayer;

a valve stem received within the inner pressure chamber of said poppet means, a first end of said valve stem engaging the inner wall of said poppet means to form a seal thereagainst; and means by which to break the seal formed between the first end of said valve stem and the inner wall of said poppet means while said sprayer is being primed, such that the air trapped within the outer pressure chamber of said poppet means escapes to the atmosphere by way of said inner pressure chamber to permit said outer pressure chamber to be filled with liquid from the container.

2. The pump sprayer recited in claim 1, wherein said valve stem has an outwardly flared sealing skirt at said first end thereof for engaging the inner wall of said poppet means to form said seal thereagainst.

3. The pump sprayer recited in claim 1, wherein said means to break the seal between said first end of said valve stem and the inner cylindrical wall of said poppet means includes protrusion means projecting from said inner wall, said valve stem and said poppet means moving relative to one another during the priming of said sprayer, such that said first end of said valve stem and the protrusion means of said inner wall engage one another to establish an air gap between said inner wall and said first end of said valve stem.

4. The pump sprayer recited in claim 3, wherein said protrusion means are a plurality of bumps spaced from one another around the periphery of the inner cylindrical wall and projecting radially therefrom into the inner pressure chamber of said poppet means to engage the said first end of said valve stem to break said seal during the priming of said sprayer.

5. The pump sprayer recited in claim 1, wherein the inner cylindrical wall of said poppet means is open at one end thereof, such that said inner pressure chamber lies in fluid communication with the orifice outlet of said spray head by way of said open end of said inner wall.

6. The pump sprayer recited in claim 5, wherein said valve stem and said poppet means move relative to one another after said sprayer is primed and while said seal is formed between said first end of said valve stem and the inner cylindrical wall of said poppet means for creating a suction force to pull liquid from the orifice outlet of said spray head into said inner pressure chamber of said poppet means by way of the open end of said inner cylindrical wall.

7. A manually operated pressure build-up pump sprayer for dispensing liquid from a container and comprising:
   a cap to be removably connected to the container, said cap having a bore extending longitudinally therethrough;
   a spray head having an orifice outlet through which liquid from the container is sprayed to the atmosphere, said spray head being interconnected with and moved reciprocally relative to said cap in response to a force manually applied to said spray head;
   poppet means engaging said spray head and moving reciprocally through the bore of said cap, said poppet means having cylindrical inner and outer walls concentrically aligned with and spaced from one another, such that an inner pressure chamber is formed at the interior of said inner cylindrical wall and an outer pressure chamber is formed in the space between said inner and outer cylindrical walls, said inner pressure chamber extending through said poppet means and communicating fluidically with said orifice outlet and said outer pressure chamber extending completely through said poppet means in parallel alignment with said inner pressure chamber and filling with liquid while said sprayer is being primed; and
   means by which to spray liquid from said outer pressure chamber of said poppet means through said orifice outlet of said spray head after said sprayer is primed and when said poppet means moves downwardly through the bore of said cap means and to suction liquid away from said orifice outlet and into said inner pressure chamber of said poppet means to prevent clogging of said orifice outlet when said poppet means moves upwardly through said bore.

8. The pump sprayer recited in claim 7, further comprising means to refill said outer pressure chamber of said poppet means with liquid from the liquid container when said poppet means moves upwardly through the bore of said cap to replace the liquid sprayed from said outer chamber through said orifice outlet during a preceding downward movement of said poppet means.

9. The pump sprayer recited in claim 7, further comprising sealing means to fluidically isolate said inner and outer pressure chambers of said poppet means when liquid is suctioned from said orifice outlet into said inner pressure chamber of said poppet means, said inner cylindrical wall of said poppet means having an open end through which said liquid is suctioned from said orifice outlet into said inner pressure chamber.

10. The pump sprayer recited in claim 7, wherein said means for spraying liquid through said orifice outlet and for suctioning liquid away from said orifice outlet includes a valve stem received within the inner pressure chamber of said poppet means, a first end of said valve stem engaging the inner wall of said poppet means to form a seal thereagainst; and
   means by which to break the seal between said first end of said valve stem and the inner wall of said poppet means while said sprayer is being primed, such that air within said outer chamber of said poppet means is exhausted to the atmosphere by way of said inner pressure chamber to permit said outer pressure chamber to be filled with liquid from the container.

11. The pump sprayer recited in claim 10, wherein said first end of said valve stem has an outwardly flared sealing skirt for engaging the inner wall of said poppet means to form said seal thereagainst.

12. The pump sprayer recited in claim 10, wherein said means to break the seal between the said first end of said valve stem and the inner cylindrical wall of said poppet means includes protrusion means projecting from said inner wall, said valve stem and said poppet means moving relative to one another during the priming of said sprayer, such that said first end of said valve stem and the protrusion means of said inner wall engage one another to establish an air gap between said inner wall and said first end of said valve stem.

13. The pump sprayer recited in claim 12, wherein said protrusion means are a plurality of bumps spaced from one another about the periphery of the inner cylindrical wall of said poppet means and projecting radially therefrom into said inner pressure chamber to engage said first end of said valve stem to break said seal during the priming of said sprayer.

14. A manually operated pressure build-up pump sprayer for dispensing liquid from a container and comprising:
   a cap to be removably connected to the container, said cap having a bore extending longitudinally therethrough;
   a spray head having an orifice outlet through which liquid from the container is sprayed to the atmosphere, said spray head being interconnected with and moved reciprocally relative to said cap in response to a force manually applied to said spray head;
   poppet means engaging said spray head and moving reciprocally through the bore of said cap, said poppet means having cylindrical inner and outer walls concentrically aligned with and spaced from one another, such that an inner pressure chamber is formed at the interior of said inner cylindrical wall and an outer pressure chamber is formed in the space between said inner and outer cylindrical walls, said inner pressure chamber communicating fluidically with said orifice outlet and said outer pressure chamber filling with liquid from the container while said sprayer is being primed;
   means including a valve stem by which to spray liquid from said outer pressure chamber of said poppet means through said orifice outlet of said spray head after said sprayer is primed and when said poppet means moves downwardly through the bore of said cap and to suction liquid away from said orifice outlet and into said inner pressure chamber of said poppet means to prevent clogging of said orifice outlet when said poppet means moves upwardly through said bore, said valve stem received within the inner pressure chamber of said popper means such that a first end of said valve stem engages the inner wall of said poppet means to form a seal thereagainst; and means by which to break the seal formed between said first end of said valve stem and the inner wall of said poppet means while said sprayer is being primed such that air trapped within said outer chamber of said poppet means is exhausted to the atmosphere by way of said inner pressure chamber to permit said outer pressure chamber to be filled with liquid from the container.

* * * * *